US006964399B1

(12) United States Patent
O'Neill

(10) Patent No.: US 6,964,399 B1
(45) Date of Patent: Nov. 15, 2005

(54) APPLIANCE MOUNTING DEVICE

(75) Inventor: Edward L. O'Neill, Oakland, CA (US)

(73) Assignee: Lucasey Manufacturing Co., Oakland, CA (US)

( * ) Notice: Subject to any disclaimer, the term of this patent is extended or adjusted under 35 U.S.C. 154(b) by 0 days.

(21) Appl. No.: 10/829,883

(22) Filed: Apr. 22, 2004

(51) Int. Cl.[7] ................................................. E04G 3/00

(52) U.S. Cl. ............................ 248/292.13; 248/297.11; 248/922

(58) Field of Search ........................ 248/282.1, 289.11, 248/297.11, 297.21, 299.1, 291.1, 325, 917, 248/922, 284.1, 286.1, 292.11, 292.13, 294.1, 248/292.14; 211/99, 104

(56) References Cited

U.S. PATENT DOCUMENTS 4,852,842 A * 8/1989 O'Neill ................... 248/284.1
6,478,274 B1 * 11/2002 Oddsen, Jr. .............. 248/274.1
6,554,242 B2 * 4/2003 Kim ........................... 248/371
6,601,811 B1 * 8/2003 Van Lieshout ........... 248/282.1
6,886,701 B2 * 5/2005 Hong et al. ................... 211/99
2004/0262474 A1 * 12/2004 Boks et al. .............. 248/276.1

* cited by examiner

*Primary Examiner*—Ramon O Ramirez
(74) *Attorney, Agent, or Firm*—Niro, Scavone, Haller & Niro

(57) ABSTRACT

An appliance mounting device for mounting appliances such as flat panel TVs at desirable mounting angles which, in a preferred embodiment, includes a base plate having a back panel and upper and lower flanges, one or more base brackets and associated swing brackets, a spring assembly and a spring force adjustment assembly. The base and swing brackets may be pivotally connected at one end. The spring system may be designed and configured to substantially counterbalance the weight of the appliance. The spring force adjustment assembly may include a carriage associated with the base bracket and an anchor rod to which the spring assembly is connected. Simple threaded fasteners may be employed to lock the brackets to the base plate and to adjust the spring force applied to the swing bracket.

9 Claims, 6 Drawing Sheets

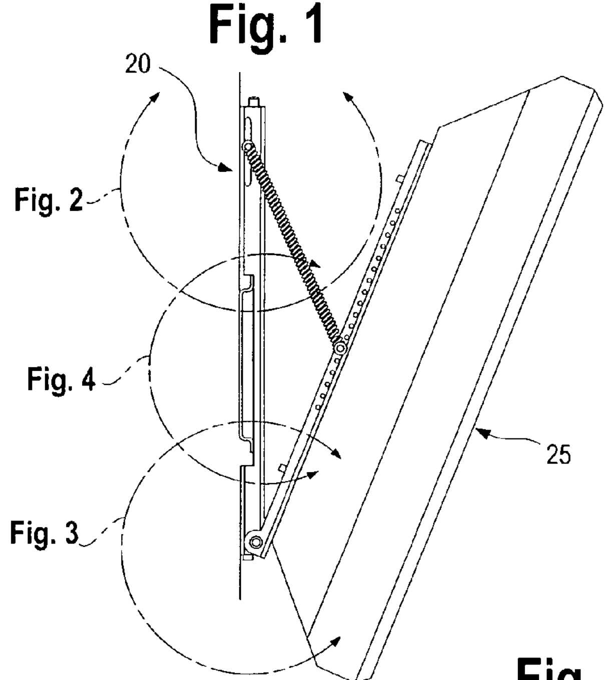
Fig. 1
20
Fig. 2
Fig. 4
Fig. 3
25
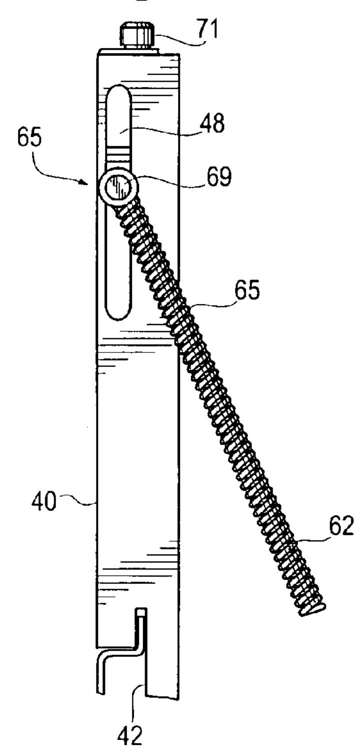
Fig. 2
71
48
65
69
65
40
62
42
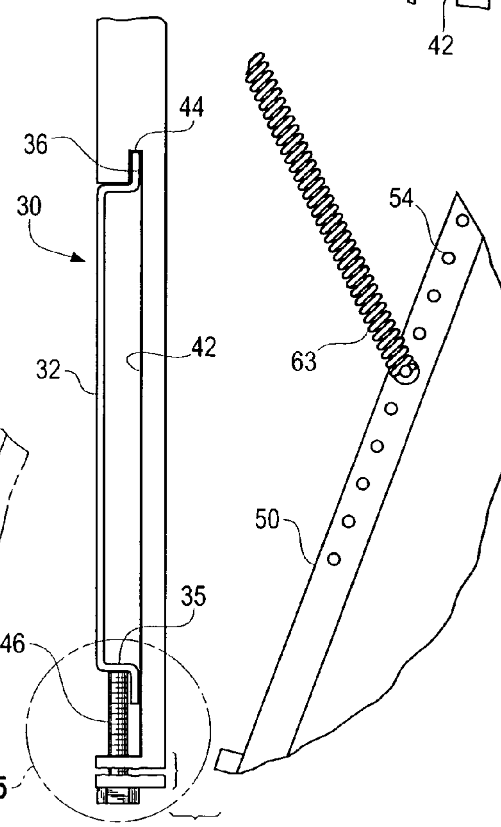
Fig. 4
44
36
30
32
42
54
63
50
35
46
Fig. 5
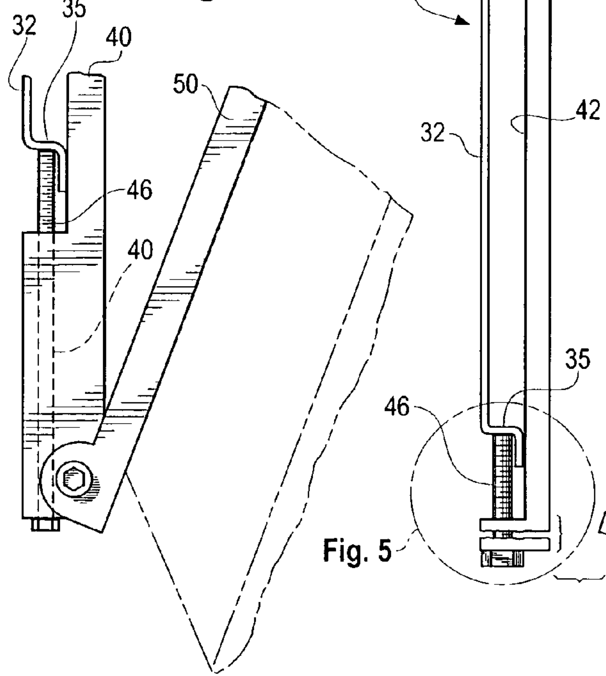
Fig. 3
32
35
40
50
46
40
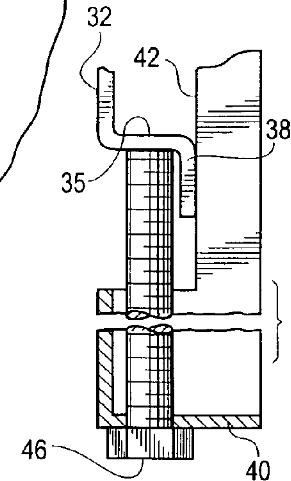
Fig. 5
32
42
38
35
46
40

APPLIANCE MOUNTING DEVICE

BACKGROUND OF THE INVENTION

The present invention relates generally to an apparatus for adjustably mounting an appliance. More particularly, the invention relates to a device used to adjustably and securely mount an appliance such as a flat screen television.

When an appliance such as a flat screen TV is mounted on a support surface such as a wall or other structure, several design considerations should be considered. Positional adjustment may be highly desirable. For example, in a flat screen TV application, the monitor often may need to be oriented toward the viewing audience. In some instances, it may be desirable to angle or tilt the screen to eliminate glare that may otherwise result from an external light source. To take advantage of the flat screen design, it may also be desirable to mount the appliance in close proximity to the mounting surface. The mounting device preferably also has a relatively slim profile, with as much of the device hidden from view as possible for enhanced aesthetic appearance.

The present invention achieves all of these objectives and provides new advantages not previously obtainable with prior appliance mounting devices.

SUMMARY OF THE INVENTION

The present invention provides a novel solution to the above-mentioned design considerations by providing a mounting device that includes a base plate, one or more base brackets and associated swing brackets, a spring assembly, and a spring force adjustment assembly. The base plate includes a back panel and upper and lower flanges which are displaced from the plane of the back panel. The base bracket includes first and second retainers that engage, respectively, the upper and lower flanges. The swing bracket is pivotally connected to the base bracket and can be positioned in many different angular orientations relative to the base bracket. The appliance, in turn, is mounted to the swing bracket. The force adjustment assembly allows the force applied to the swing bracket to be varied.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 1 is a side view of one preferred embodiment of the appliance mounting device of the present invention;

FIGS. 2–4 are enlarged views of the circled portions of the device shown in FIG. 1 with the corresponding figure number;

FIG. 5 is an enlarged view of the circled portion of the device shown in FIG. 4;

DETAILED DESCRIPTION OF THE PREFERRED EMBODIMENTS

Figure 6:
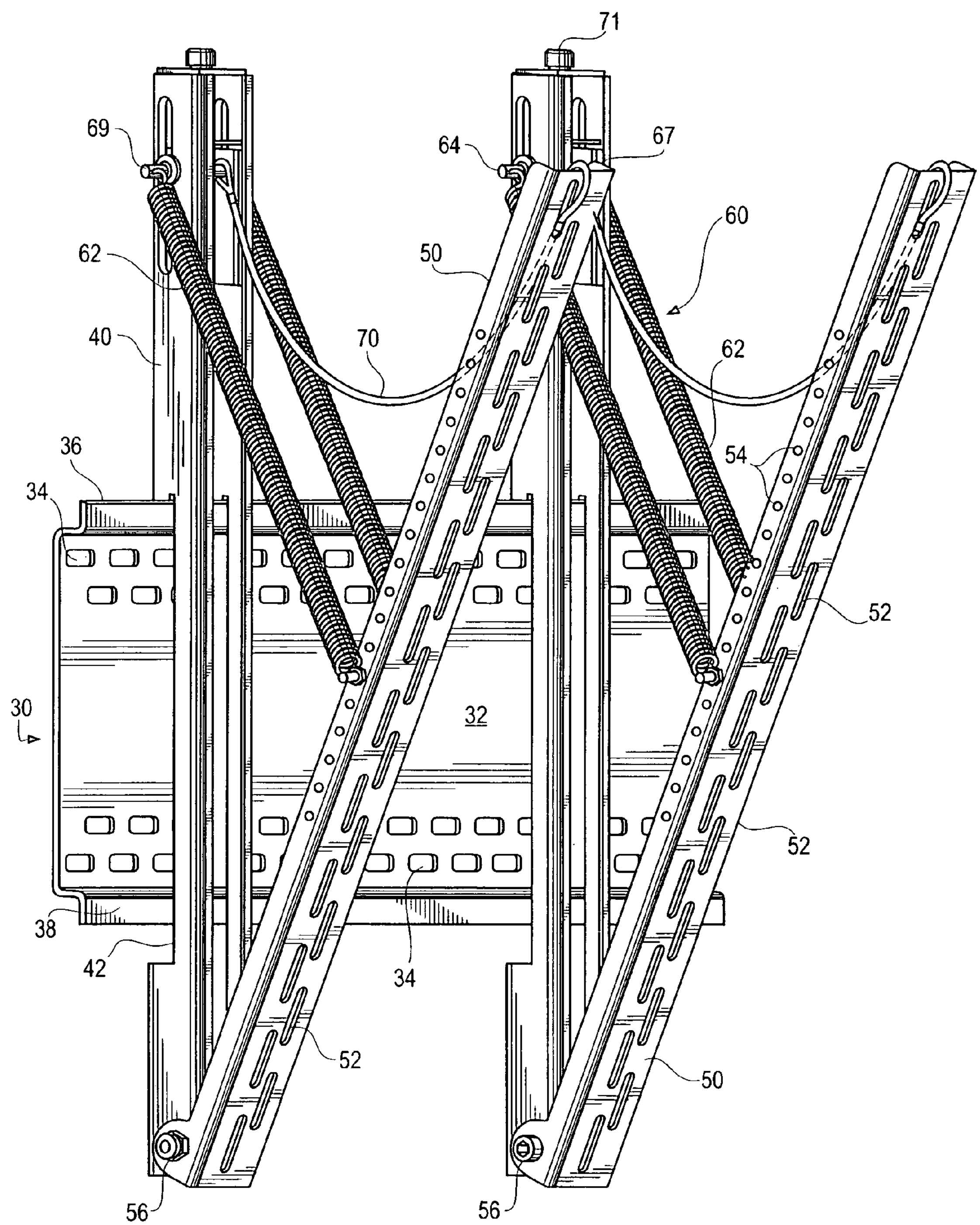
FIG. 6 is a front perspective view of the device shown in FIG. 1.
Figure 7:
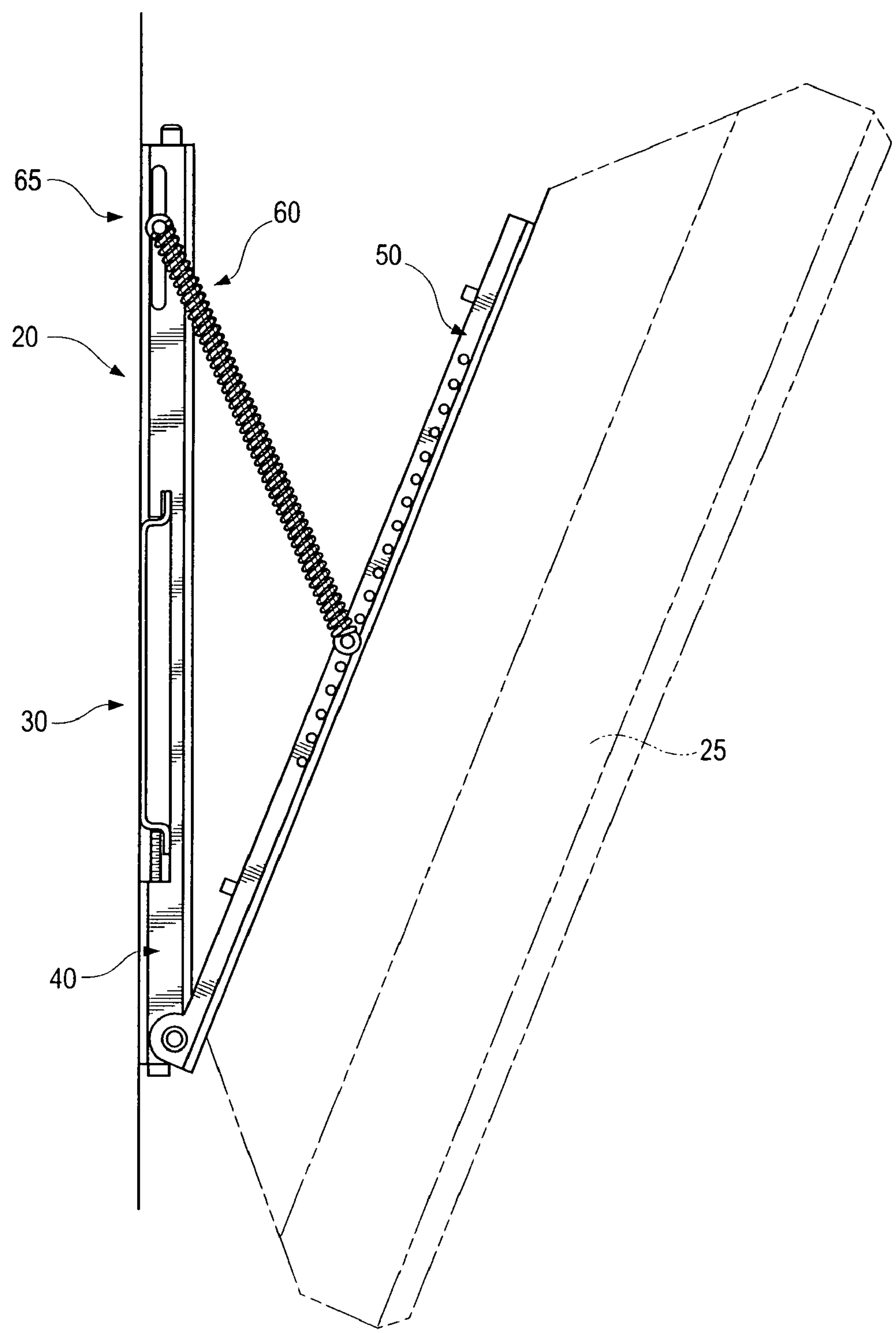
FIG. 7 is an enlarged view of the device shown in FIG. 1.
Figure 8:
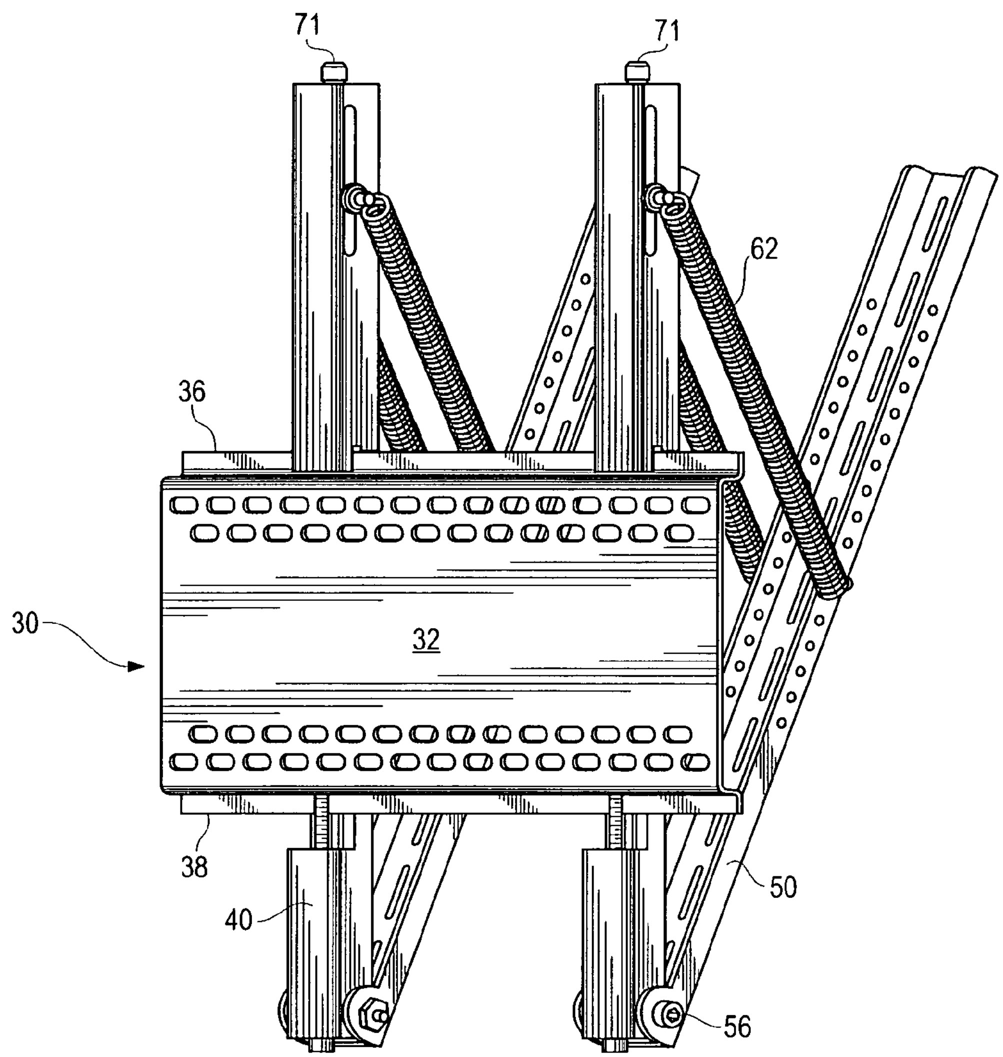
FIG. 8 is a rear perspective view of the device.

Set forth below is a description of what are believed to be the preferred embodiments and/or best examples of the invention claimed. Alternatives and modifications to this preferred embodiment are contemplated, and any such alternatives or modifications which make insubstantial changes in function, in purpose, in structure, or in result are intended to be covered by the claims of this patent.

With reference now to the various Figures, an apparatus constructed in accordance with one preferred embodiment of the present invention is designated generally by reference numeral 20 and is shown for use in mounting a flat panel TV 25 to any suitable surface, typically a generally vertical wall. The apparatus includes, as major components, a base plate 30, one or more elongated base brackets 40 and associated swing brackets 50, a spring assembly 60, and a spring adjustment assembly 65.

Base plate 30 includes a generally planer back panel 32 having an array of slotted apertures 34 for conveniently mounting the apparatus to the wall surface by any one of the many fastening techniques well known to those of skill in the art. Base plate 30 also has upper and lower flanges 36 and 38 which are displaced from the plane of back panel 32.

Each base bracket 40 is provided with first and second retainers to engage the base plate upper and lower flanges, respectively. In the illustrated embodiment, the base bracket includes a rear recess 42 having a slot 44 which comprises the first retainer and adapted to receive the upper base plate flange 36. The second retainer comprises a fastener, preferably a threaded fastener such as bolt 46, positioned to capture the base plate lower flange 38. As illustrated in FIGS. 3–5, bolt 46 may extend upwardly from the end of the base bracket 40 so that its free end engages shoulder 35 on the base plate 30 and therefore locking the base plate and bracket in assembled relation. Recess 42 is preferably dimensioned so that the base bracket is mounted very close to or in contact with the wall surface to minimize the space requirements of the apparatus. In other words, the depth of the recess 42 is generally equal to the amount of displacement of the base plate flanges 36 and 38 relative to the base plate back panel 32. The base bracket 40 also preferably includes upper slots 48 whose functionality will be described below.

A swing bracket 50 is associated with each base bracket 40. In the illustrated embodiment, swing bracket 50 is pivotally mounted at its lower end to the lower end of the base bracket, allowing the swing brackets to be oriented at various angular positions relative to the base brackets and, therefore, relative to the wall surface as well. The swing brackets 50 are also provided with a plurality of elongated apertures 52 to accommodate the many different mounting site locations found on different sizes and brands of appliances 25. Preferably, the swing bracket also has a series of side apertures 54 to allow different mounting locations for the spring assembly 60. The swing bracket is pivotally connected to the base bracket 40 via a threaded pivot axis having pivot nuts 56 on each end.

The spring assembly 60 shown in the illustrated embodiment comprises on or more extension springs 62, each attached at one end 63 to the swing brackets 50 and at the other end 65 to the base brackets 40. Preferably, the spring assembly cooperates with a spring adjustment assembly, designated generally by reference numeral 65, allowing the biasing force applied to the swing brackets 50 by the springs 62 to be varied.

The spring adjustment assembly 65 includes a carriage 67 to which the rod 69 is fixed. The rod 69 serves to anchor the upper spring end 65. The carriage 67 is movably nested with the base bracket 40. The ends of rod 69 extend through and are captured by slots 48, thereby limiting the movement of the rod along the length of the base bracket 40. The carriage 67, in turn, engages the threaded fastener 71 located at the top of bracket 40. Therefore, by adjustment of fastener 71, the carriage 67 and rod 69 may be moved along the portion of the base bracket length defined by slots 48, and thereby adjust the amount of biasing force applied via the springs 62 to the swing brackets 50.

In use, the base plate 30 may be appropriately positioned and secured to the wall and the appliance 25 assembled to one or more swing brackets, as needed. Then the appliance and brackets are lifted onto the base plate, so that the slots 44 of the base brackets engage the upper flange 36 of base plate 30. Because the upper flange extends substantially across the width of the base plate, positioning of the appliance is facilitated and a single sized base plate can accommodate many different TVs with widely different mounting site locations. Once properly positioned on the base plate, the assembly is secured to the base plate by tightening the base bracket fasteners 46. Next, the angular orientation of the appliance may be set by adjustment of the fasteners 71. Once properly positioned, the pivot nuts 56 are tightened to further secure the appliance in the desired position.

Safety cables 70 are preferably employed to prevent catastrophic failure of the mounting device.

Figure 9:
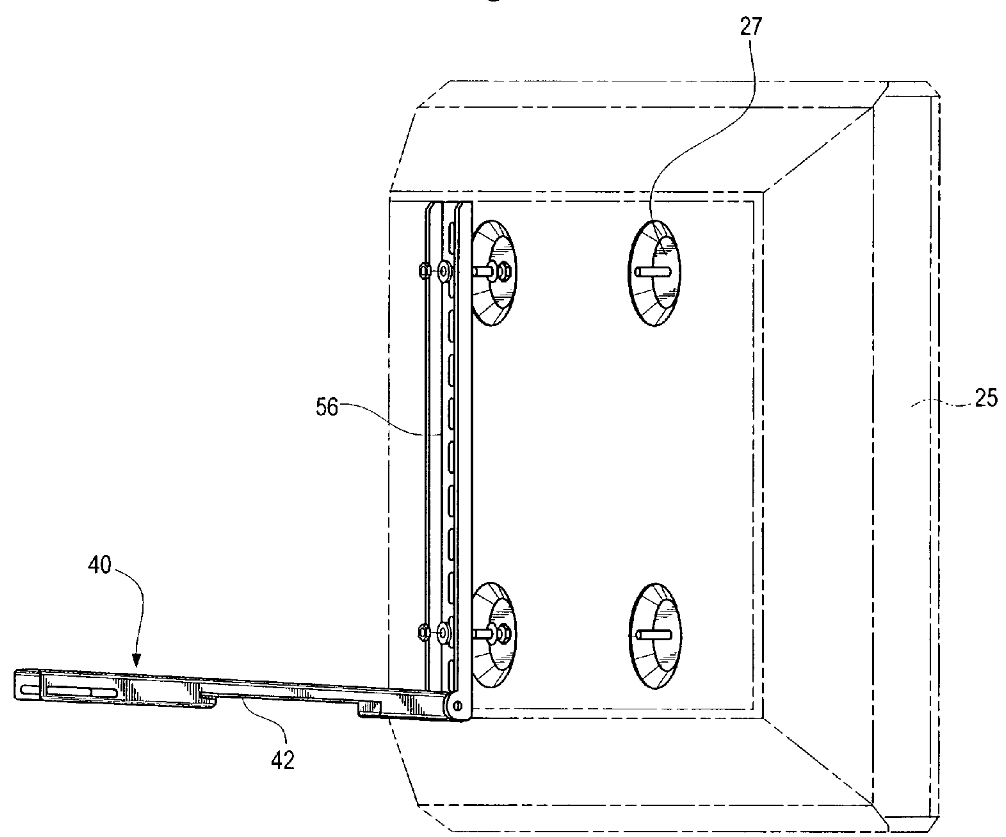
FIG. 9 is a rear perspective view illustrating a preferred technique for assembling the device shown in FIG. 1 to an appliance having recessed mounting sites.
Figure 10:
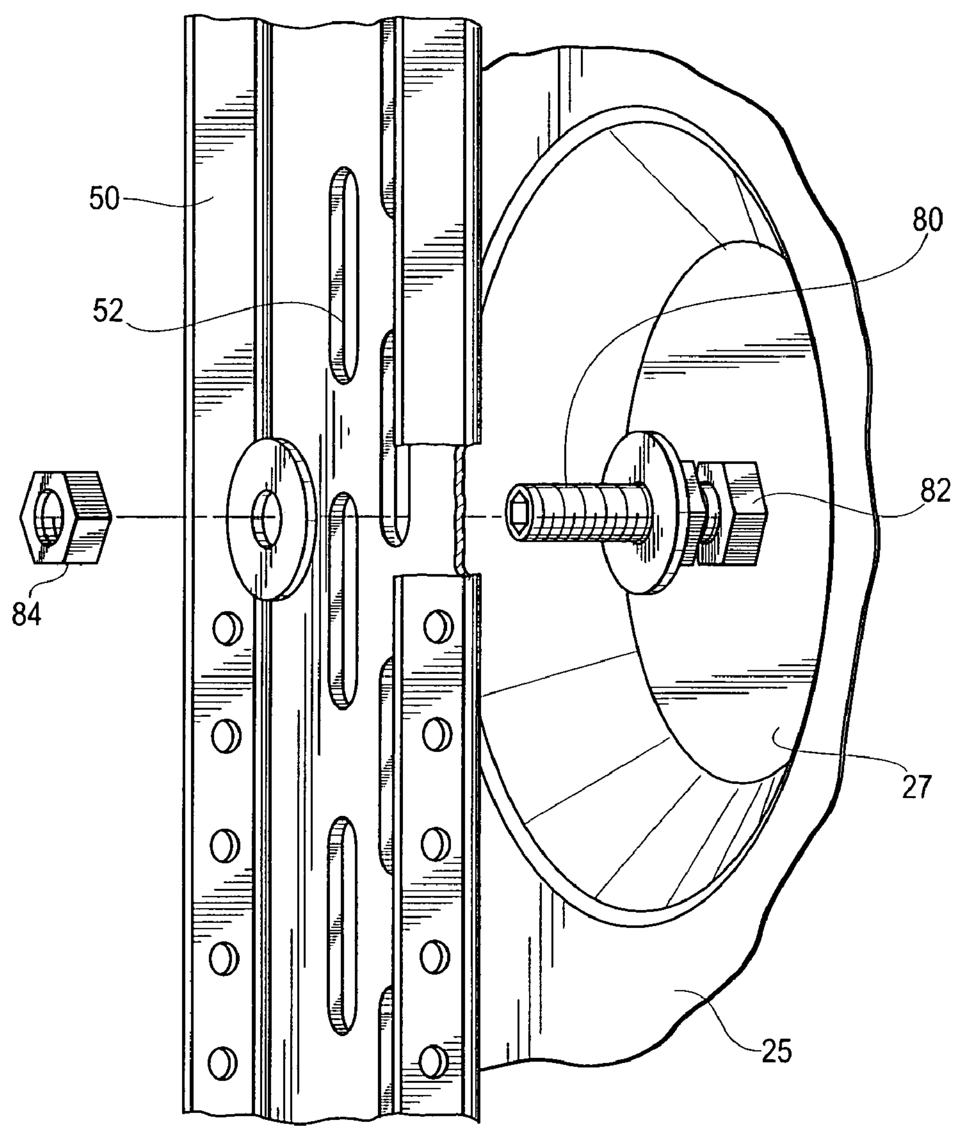
FIG. 10 is an enlarged exploded view of a portion of FIG. 9.

FIGS. 9 and 10 illustrate an assembly arrangement when the apparatus of the present invention is used with an appliance having recessed mounting sites. Typically, such sites include a well 27 with a centrally located threaded aperture. Studs 80 may be threaded into these apertures and lock nuts 82 used to fix the axial position of the studs. Then, the swing brackets 50 are located over the studs 80, through apertures 52, and secured to the studs via nuts 84. In the case where the appliance has flush mounting sites, the brackets 50 are simply bolted directly to the back of the appliance.

Other changes and modifications constituting insubstantial differences from the present invention, such as those expressed here or others left unexpressed but apparent to those of ordinary skill in the art, can be made without departing from the spirit and scope of the present invention and without diminishing its attendant advantages. For example, the springs 62 may be anchored to the base plate rather than to the base bracket. Likewise, the spring force adjustment assembly may be associated with the base plate or the wing bracket rather than with the base bracket. It is, therefore, intended that such changes and modifications be covered by the following claims.

I claim:

1. An apparatus for mounting an appliance, comprising:

a base plate securable to a surface and having an upper flange and a lower flange;

an elongated base bracket having a first retainer to engage the base plate upper flange and a second retainer to engage the base plate lower flange;

a swing bracket adapted to mount an appliance and having one end pivotally connected to the base bracket and positionable at various angular orientations relative to said base bracket;

a spring in operative association with the swing bracket, said spring applying a biasing force to said swing bracket to resist rotation of the swing bracket away from the base bracket; and a spring adjustment assembly to vary the biasing force applied to the swing bracket.

2. The appliance mounting apparatus of claim 1 further comprising:

a plurality of base brackets and associated swing brackets.

3. The appliance mounting apparatus of claim 1 wherein said base plate has a surface engaging back panel and the upper flange is displaced from the plane of the back panel.

4. The appliance mounting apparatus of claim 1 wherein the first retainer comprises a recess having a configuration to receive the base plate upper flange.

5. The appliance mounting apparatus of claim 1 wherein the second retainer comprises an adjustable fastener that secures the base bracket to the base plate.

6. The appliance mounting apparatus of claim 1 wherein the spring is connected at one end to a movable spring anchor.

7. The appliance mounting apparatus of claim 6 wherein the movable anchor is associated with the base bracket.

8. The appliance mounting apparatus of claim 1 wherein said base plate includes first and second side edges and the upper flange extends substantially from the first edge to the second edge; and the base bracket may be positioned at substantially any location along said upper flange.

9. The appliance mounting apparatus of claim 7 wherein the swing bracket includes a plurality of apertures to accommodate different mounting sites on different appliances.

* * * * *